Patented Oct. 19, 1926.

1,604,068

UNITED STATES PATENT OFFICE.

WILLIAM H. OLDACRE, OF CHICAGO, ILLINOIS, ASSIGNOR TO D. A. STUART & CO., A CORPORATION OF ILLINOIS.

CUTTING FLUID AND PROCESS OF MAKING THE SAME.

No Drawing.     Application filed April 15, 1925. Serial No. 23,409.

The present invention relates particularly to the art of cutting fluids adapted for use under conditions where lard oil can be employed to advantage; and it may be said to have for its object to produce a comparatively cheap cutting fluid that shall possess substantially all of the useful qualities of lard oil and be free from many of those characteristics of lard oil that may be regarded as undesirable.

It is well recognized that cutting lubricants must possess an adhesiveness or residual chemical activity that mineral oils do not have. Therefore, though many of such mineral oils are cheap and can readily be obtained, they are not suitable for cutting purposes in their natural state. One expedient for lending cutting qualities to mineral oils, that has been very generally adopted, is to mix with such oils a cutting compound or base made from animal or vegetable oils or fats. Use has also been made of mixtures of mineral oils and sulphur, the sulphur being in some instances in solution, in colloidal suspension, or in a loose chemical combination with the oils. Probably the most common method of incorporating sulphur directly in a mineral oil has been that of heating an intimate mixture of powdered sulphur in a mineral oil. However, the amount of sulphur that can be incorporated in a mineral oil by any of these latter methods is small, and the resulting product is unstable, with the result that considerable difficulty has been experienced in their use due to the settling out of the sulphur to a greater or lesser extent. Inasmuch as the cutting quality or adhesiveness of such a cutting lubricant depends largely on the amount of sulphur that it can be made to carry, cutting lubricants made from mineral oils and sulphur, by the foregoing methods are not altogether satisfactory. Cutting lubricants made by heating a mixture of mineral oil and sulphur have the further objection that they possess a disagreeable odor due to the hydrogen sulphide and other ill smelling sulphur compounds that are produced in the process of manufacture.

Viewed in one of its aspects, the object of the present invention is to produce a simple and novel process whereby a mineral oil may be converted into a cutting fluid having all of the desirable qualities of the best types of cutting fluids as, for example, lard oil, including the characteristic of adhesiveness or residual chemical activity.

When sulphur is incorporated in a body of mineral oil by heating a mixture of oil and sulphur, there is at best only a loose chemical combination between the two materials, as physical tests, such as gravity tests and cold tests on oil so treated, are such as are to be expected from mere mixtures.

Owing to the fact that a cutting compound must be fluid at all times, under widely varying conditions, it is desirable that the solidifying content or cold test be as low as possible, and a compound or fluid having a low cold test is to be preferred to one that will solidify at a higher temperature.

Viewed in another of its aspects, the present invention may be said to have for its object the production of a modified mineral oil, in which sulphur will be in strong chemical combination, thus producing a cutting fluid that will be entirely homogeneous, stable, have an extremely low cold test and be free from the objectionable odors associated with the so-called sulphurized mineral oils.

In carrying out my invention I add to a body of mineral oil a quantity of sulphur chloride and heat the mixture while agitating the same. The application of external heat is necessary, since the necessary reactions apparently do not take place at ordinary temperatures or, take place so slowly as to make the process impracticable. The temperature at the start should not be as high as the boiling point of the sulphur chloride. I have found that the process can be effectively carried out with ordinary refined mineral oils such as those known to the trade as paraffin oil, red engine oil, neutral oils, etc., at a minimum temperature in the neighborhood of 170 degrees F. In the case of steam-refined stocks and oils more in the nature of residuums, lower temperatures may be effective. The gases evolved during the reaction must be removed, either by neutralizing them or by bodily removing them. Perhaps the simplest way of getting rid of the gases is to blow air through the mixture while the reaction is taking place. When the evolution of gas ceases the operator is informed that the reaction is complete. The air blown through the oil may serve also as the agitating means, thus obviating the necessity of any other form of agitation.

I have found that when mineral oil treated in accordance with my invention contains about three and one-half percent by weight of sulphur, it becomes a practically perfect cutting fluid; and I believe that this percentage of sulphur is the most advantageous one, although I do not wish to be limited to this particular formula, as the amount of sulphur may be varied within wide limits, according to the results that are desired. In order to produce a sulphur content of three and one-half percent, it is necessary to add about seven percent of sulphur chloride to the oil to be treated.

The product resulting from my improved process is apparently a new chemical compound in which there is no free sulphur, or sulphur in such a state that it may separate itself from the liquid and settle. In every instance where I have made tests, I have found that the cold test of a mineral oil is greatly lowered when treated in accordance with my improved process, whereas there is no such lowering but frequently an increase in the cold test of the same oils when they are sulphurized by heating a mixture of oil and sulphur. Furthermore, the mixtures produced by heating oil and sulphur are not very stable and if the products contain any considerable amount of sulphur they are extremely unstable and a large part of the sulphur will soon settle out. Whereas it is a simple matter to produce a stable product containing as much as three and one-half percent of sulphur, by my process, it would probably be impossible to introduce that much sulphur into a mineral oil by heating the same together, without having much of the sulphur settle in the bottom of the container before the consumer could use it.

The so-called sulphurized mineral oils have a disagreeable odor, particularly when they become hot and hydrogen sulphide is liberated. None of these disagreeable odors are present in oil treated in accordance with my improved process, and they are not created during the use of the oils.

I claim:

1. The method of transforming a refined mineral oil into an efficient cutting fluid, which consists in treating the oil with sulphur chloride in the presence of heat, and eliminating the gases that are set free.

2. The method of transforming a refined mineral oil into an efficient cutting fluid, which consists in heating a mixture of the same and sulphur chloride to a temperature such as to cause a chemical combination between the oil and the sulphur chloride sufficient materially to lower the cold test of the oil.

3. The method of transforming a refined mineral oil into an efficient cutting fluid, which consists in heating a mixture of the same and sulphur chloride to a temperature sufficient to cause substantially all of the sulphur in the chloride to enter into stable chemical combination with the oil.

4. A cutting fluid comprising a stable chemical combination of mineral oil and sulphur, produced by combining refined mineral oil chemically with sulphur chloride.

5. A cutting fluid comprising a refined mineral oil having about three and one-half percent of sulphur in stable chemical combination therewith.

In testimony whereof, I sign this specification.

WILLIAM H. OLDACRE.